United States Patent

Bach

[15] 3,648,023

[45] Mar. 7, 1972

[54] READING AND/OR WRITING DEVICE FOR RECORD CARRIERS IN CARD FORM

[72] Inventor: Horst Werner Bach, Kirburg, Germany

[73] Assignee: U.S. Philips Corporation, New York, N.Y.

[22] Filed: Feb. 25, 1970

[21] Appl. No.: 13,898

[52] U.S. Cl. ....................................................235/61.11 D

[51] Int. Cl. ....................................................G06k 9/04

[58] Field of Search.............235/61.11 R, 61.11 A, 61.11 B, 235/61.11 C, 61.11 D, 61.11 E

[56] References Cited

UNITED STATES PATENTS

| | | | |
|---|---|---|---|
| 2,971,809 | 2/1961 | Schmidt | 235/61.11 D |
| 3,453,643 | 7/1969 | Amano et al. | 235/61.11 R |
| 3,459,904 | 8/1969 | Friend | 235/61.11 C |
| 3,479,473 | 11/1969 | Ramstetter | 235/61.11 C |

*Primary Examiner*—Daryl W. Cook
*Attorney*—Frank R. Trifari

[57] ABSTRACT

A card reader for magnetic and punched cards wherein after insertion of a card into a funnel a fence, rotatably journaled on a shaft and having a card reading head mounted thereon is pressed against the edge of the card. The reading head is therefore aligned with the card regardless of the cards alignment with respect to the funnel.

4 Claims, 4 Drawing Figures

INVENTOR.
HORST W. BACH
BY
AGENT

Patented March 7, 1972 3,648,023

3 Sheets-Sheet 2

INVENTOR.
HORST W. BACH
BY
Frank R. Trifari
AGENT

INVENTOR.
HORST W. BACH

BY
[signature]
AGENT

READING AND/OR WRITING DEVICE FOR RECORD CARRIERS IN CARD FORM

The invention relates to a device for reading and/or writing on the correct line and track of coded signals on record carriers in card form, in particular magnetic cards, in which the record carrier is aligned against a fence.

Known feeders for record carriers in card form are constructed so that on one side of a feeder funnel a resilient pressing element is provided which aligns the record carrier against an engaging edge situated at right angles to the reading and/or writing device. The record carriers in card form must be aligned against the engaging edge already before the actual feeding in such manner that during their transport to several juxtaposed transport rollers no oblique position of the record carrier occurs in order that the data stored magnetically on several juxtaposed tracts are correctly sensed and written, respectively, both as regards the line and the track. In addition said device has the great drawback that it can always be used for one given size of cards only.

It is the object of the invention to provide a sensing and/or writing device which does not exhibit the above-mentioned drawbacks and enables the record carrier to be aligned automatically against the engaging side of a fence. The device according to the invention is characterized in that the fence is rotatably journaled and is movable by means of a control disc in the direction of the side of the record carrier bearing the information, the fence comprising a reading and/or writing device arranged at right angles thereto, a follower roller which can be locked in two positions and is movable at right angles to its axis of rotation being arranged opposite to said reading and/or writing device.

In a preferred embodiment the control disc either comprises an annular slit or comprises switching buttons on its side facing the follower roller, with which buttons on the one hand the follower roller can be swung and on the other hand can be moved in the direction of the reading and/or writing device.

In order that the invention may be readily carried into effect, one embodiment thereof will now be described in greater detail, by way of example, with reference to the accompanying drawings, in which FIG. 1 is a front elevation of a device for the correct adjustment of a magnetic head.

FIG. 2 likewise is a front elevation on an enlarged scale and in greater detail of the device shown in FIG. 1.

The embodiment to be described hereinafter relates to a record carrier on which magnetic data are recorded which data are to be read and/or written by means of a magnetic head. However, the device according to the invention cannot only be used for record carriers on which the data are recorded magnetically. It is alternatively possible to use the principle according to the invention for record carriers on which the data are recorded differently, for example, punched cards.

Figure 1:
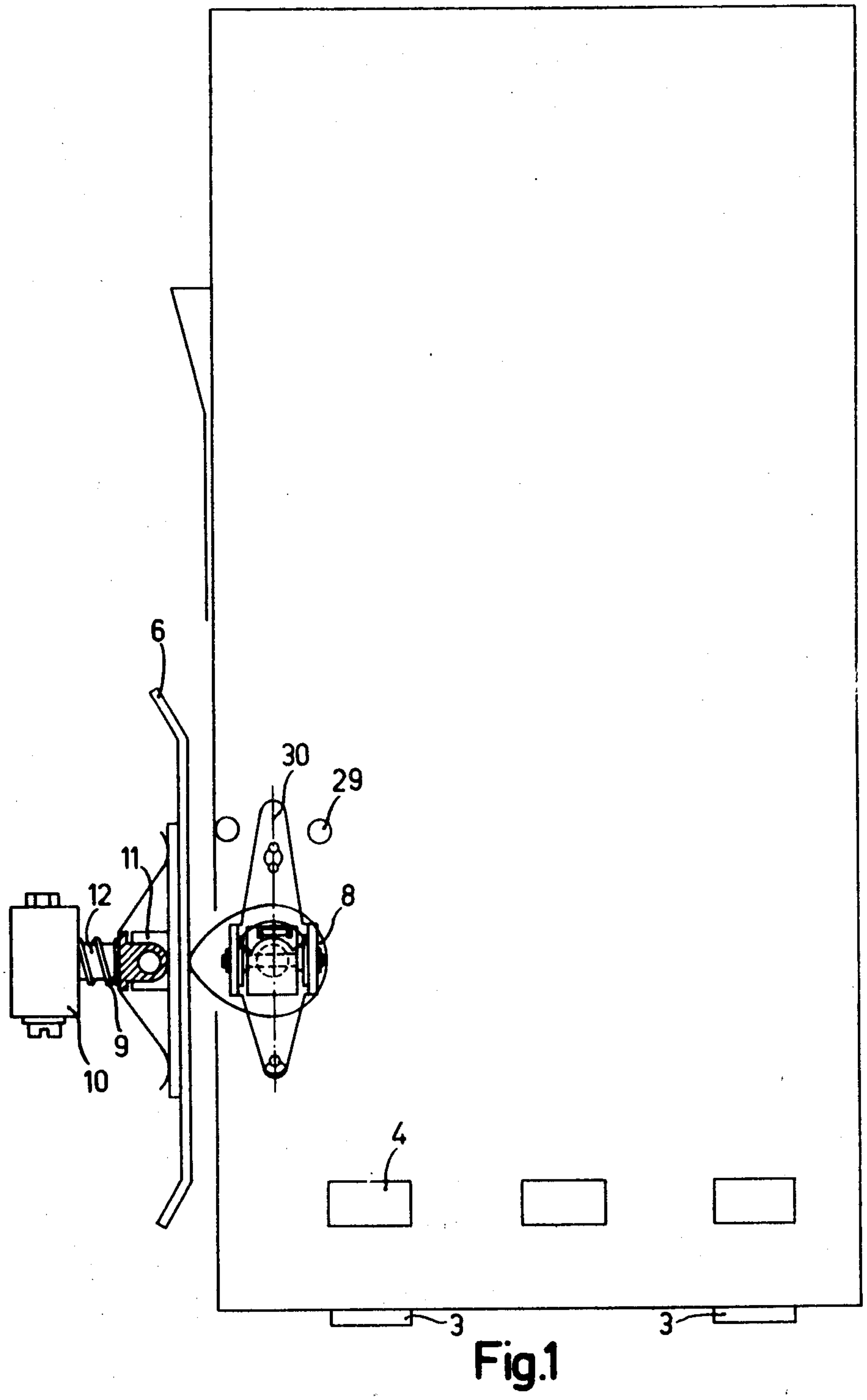

As shown in FIG. 1, a magnetic card 2 laid in the feeder funnel 1 is held in the direction of transport by the clamping arms 3. The transportation of the card 2 occurs by means of transport rollers 4, provided on a transport shaft, against which rollers the selectively operated pressure rollers 5 are pressed. Prior to the beginning of the transport movement, the resiliently journaled pressure rollers 5 are first made to engage and the clamping arms 3 are withdrawn.

Figure 2:
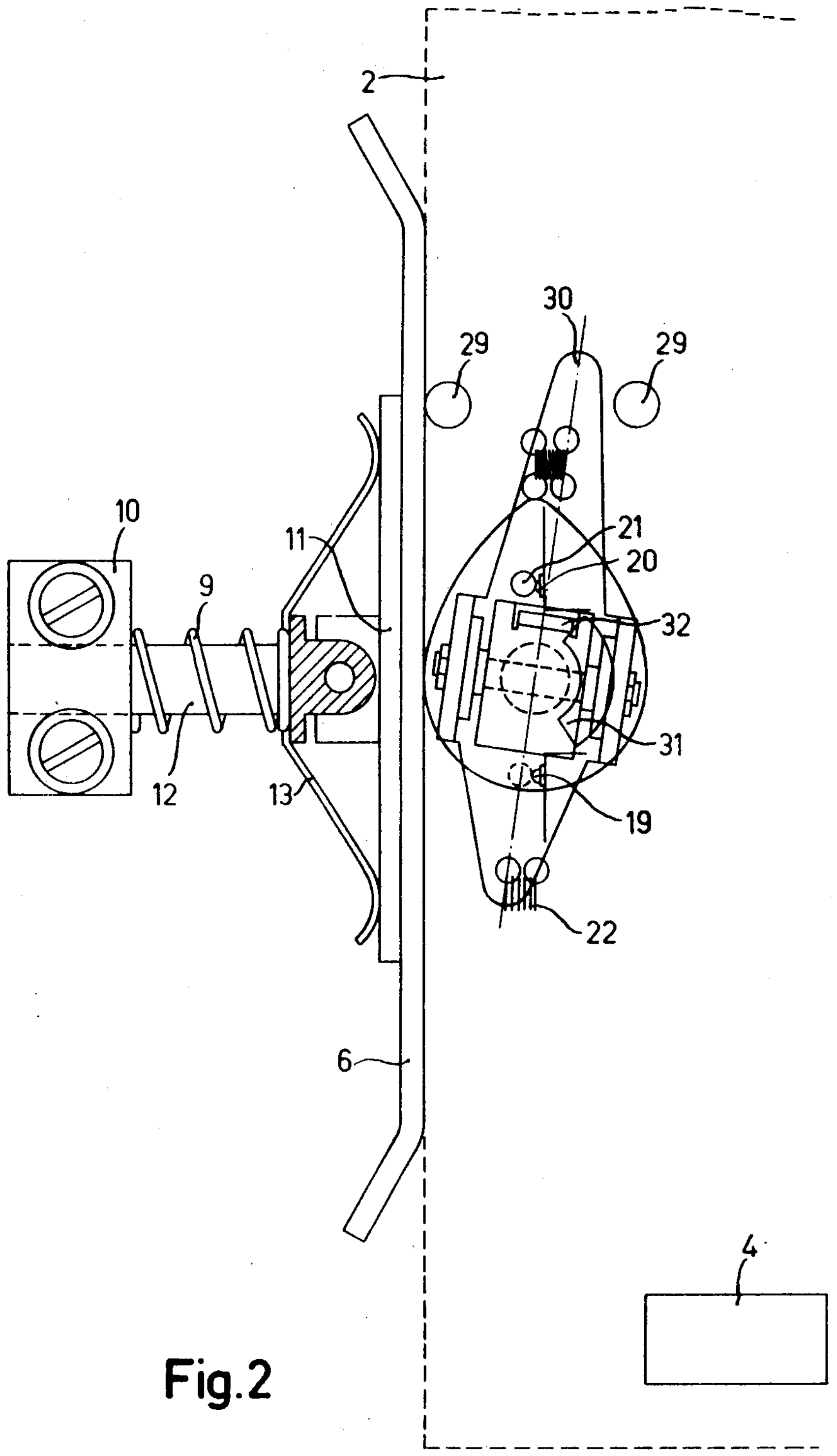

On the left-hand side of the feeder funnel 1 a device is provided for adjusting the magnetic head 7 on the correct line, which device is shown in greater detail in FIG. 2. Whereas FIG. 1 shows the device in the opened position, FIG. 2 shows the device in a position in which transportation can begin. The fence 6 in the open condition is moved away from the side of the funnel by means of an oval control disc 8. When the control disc 8 is rotated about its shaft, the fence 6 is moved in the direction of the left-hand edge of the card by means of the force of the spring 9 which is provided between a member 10 and a bearing element 11 on a guide bolt 12. The bolt 12 which is passed through a bore in the member 10 is so constructed at its end face that the fence 6 is rotatable about its shaft by means of the bearing element 11 arranged on the end face. As a result of this possibility of movement of the fence 6 it is ensured that also in the case of an oblique position of a magnetic card 2 the fence 6 engages the left-hand edge of the magnetic card 2 throughout its length. At the end face of bolt 12 a spring 13 is provided with which a force is exerted on the fence 6 which ensures that the fence 6 always assumes its perpendicular position.

Figures 3, 4:
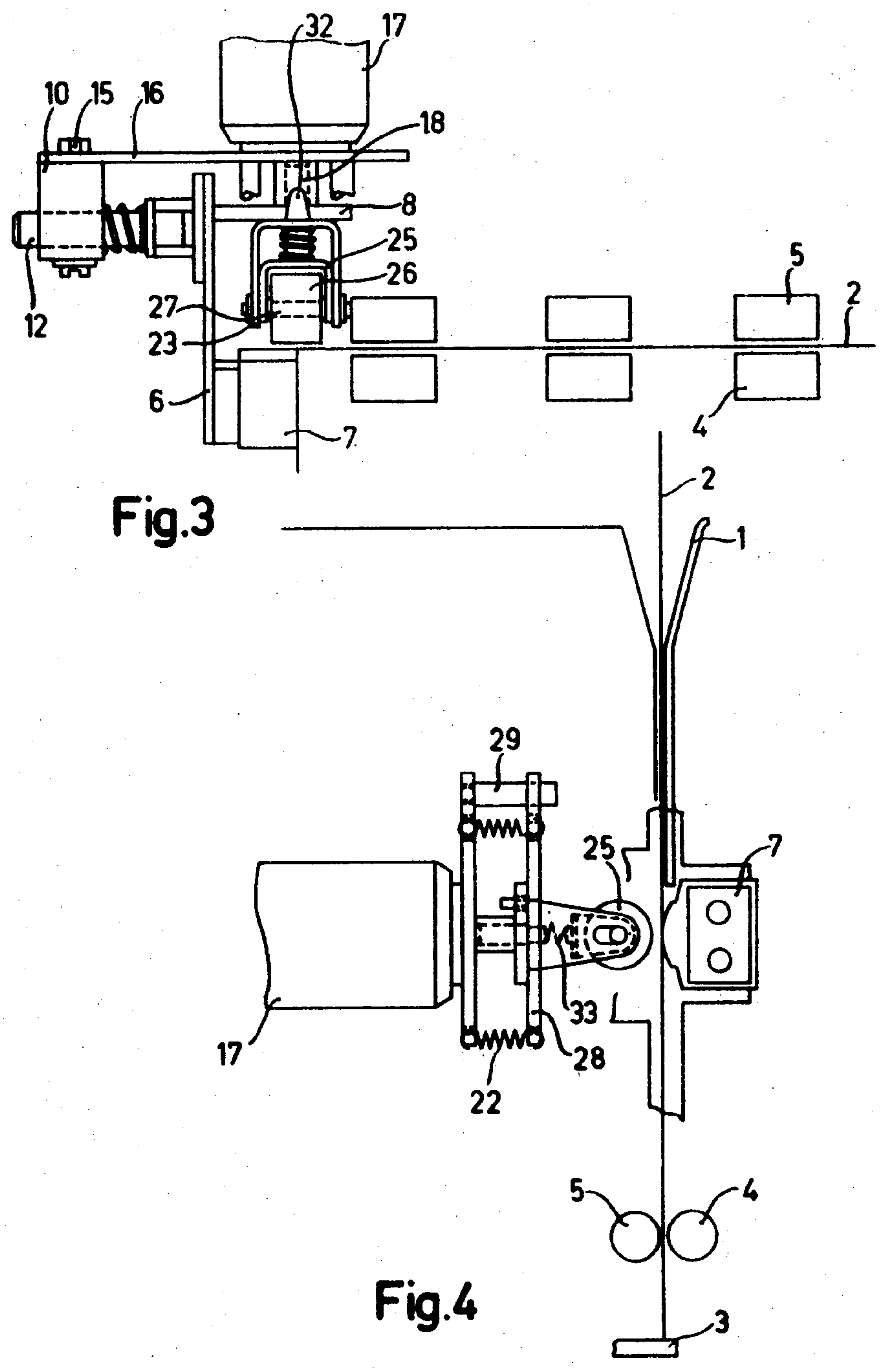
FIG. 3 is a plan view of the device shown in FIG. 1.
FIG. 4 is a side elevation of the device shown in FIG. 1.

As shown in FIG. 3, the magnetic head or magnetic heads 7 is or are rigidly secured to the fence 6, namely in a direction at right angles to the side of engagement of said fence. As a result of this the magnetic head 7 always moves with the fence 6. This arrangement is one of the most characteristic features of the invention, because, assuming the magnetic tracks on the magnetic card 2 to extend parallel to the left-hand edge of the magnetic card, the magnetic head 7 also will always become located at right angles above the magnetic tracks. Always only the parts of the data associated with one line will be sensed or written.

A plate 16 on which a driving device 17 is arranged is provided on the member 10 by means of a screw 15. A control disc 8 is secured to the shaft 18 of the driving device 17 which shaft is passed through the plate 16. The control disc 8 which can be rotated 180° shows three locking positions, namely card introducing position, transport position and ejection position. The transport and ejection positions are determined by contacts 19 and 20 which can be operated by a switching pin 21 provided on the control disc 8. In the opened condition of the device shown in FIG. 1, a plate 28 engages the control disc 8 which plate is drawn against the control disc 8 by means of the springs 22 secured on the plate 16. On its side facing the magnetic head 7, the plate 28 is bent to form a brace 23. In the brace 23 a second brace 24 is journaled which can be moved in slotted guides 25 in which a compression spring 33 is present between the two braces. The brace 24 supports a follower roller 26 journaled in said brace. The follower roller 26 which is rotatable about its shaft 27 has for its object to guide the fence 6 against the left-hand edge of the magnetic card 2 during the transport and ejection movements. For that purpose, the follower roller must have separate locking positions for the transport and ejection movements. FIG. 3 shows the follower roller 26 in its transport position. The two basic positions of the follower roller 26 secured to the plate 28 can be locked by the pin 29 arranged on the plate 16 against which pin the projection 30 of the plate 28 engages.

Since the follower roller 26 in the opened position shown in FIG. 4 is remote from the rear side of the magnetic card 2, said roller must be moved towards the magnetic head 7 again both during the transport movement and during the ejection movement. In order to achieve this the control disc 8 comprises a slit 31 (FIG. 2) in which the control stud 32 of the tape 28 can engage. The control stud 32 engaging in the slit 31 has for its object first of all to rotate the follower roller 26 and the plate 28, respectively, in one of its lockable positions and then to force the magnetic card against the magnetic head 7 by means of said members. The follower roller 26 is now moved away from the control disc 8 by moving the plate 28 towards the magnetic head 7 by means of the control stud 32. Instead of an annular slit 31, the control disc 8 may comprise switching buttons.

When a magnetic card 2 is introduced into the feeder funnel 1, the control disc 8 starts rotating to the right after clamping the magnetic card by the pressure rollers 5 and switching on of the device according to the invention. As a result of this the fence 6 moves by means of the force of the spring 9 in the direction of the left-hand side of the card which may be introduced, for example, obliquely. When the control disc 8 has rotated through a given angle, the control stud 32, the plate 28 and hence also the follower roller 26 are rotated by means of the left-hand limit of the slit 31. The plate 28 is rotated against the right-hand pin 29 against the force of the spring 22. At that instant the follower roller 26 has reached its desired position (FIG. 2). When the control disc 8 is further rotated the control stud 32 which is bevelled at both sides is pushed away by the left-hand boundary of the slit 31 and thus moves the plate 28 with the follower roller 26 in the direction of the magnetic head 7. In the mean time, the pivotally suspended fence 6 has become to engage the magnetic card 2 with its engaging side against the force of the spring 13. The magnetic head 7 is now aligned in the correct manner relative to the magnetic tracks of the card 2.

After completed transport movement, the ejection movement is desired and the control disc 8 first rotates back to its initial position which means that the follower roller 26 is moved away from the magnetic card and is turned back to its initial position, the fence 6 being again moved away from the edge of the card 2. When the control disc 8 is further rotated in the opposite sense, the same above-described operation follows with the exception that the follower roller 26 rotates to its other position and the plate 28 is held with its projection 30 by the left-hand pin 29, respectively.

What is claimed is:

1. A device for reading and writing coded information on record carriers in card form wherein the record carrying material is aligned with an edge of a card, comprising a funnel for insertion of a card therethrough, a fence rotatably journaled and slideably mounted for movement in a direction perpendicular to an edge of a card inserted through the funnel and having a linear edge facing an edge of a card inserted through the funnel, a control disc for moving the edge of the fence toward and away from the edge of a card inserted through the funnel, a reading and writing head mounted on the fence and arranged at right angles thereto, and a follower roller having an axis of rotation and mounted for revolution at right angles to its axis of rotation to two locked positions.

2. A device as claimed in claim 1, wherein the control disc is provided with an angular slit on a side remote from the follower roller for rotating the follower roller and for moving the follower roller toward and away from the reading and writing head.

3. A device as claimed in claim 1, wherein the control disc is provided with switching buttons on a side remote from the follower roller for rotating the follower roller and for moving the follower roller toward and away from the reading and writing head.

4. A device as claimed in claim 1, wherein the follower roller is resiliently journaled.

* * * * *